No. 835,517. PATENTED NOV. 13, 1906.
S. P. GLUNT.
SEED SEPARATOR.
APPLICATION FILED APR. 13, 1906.
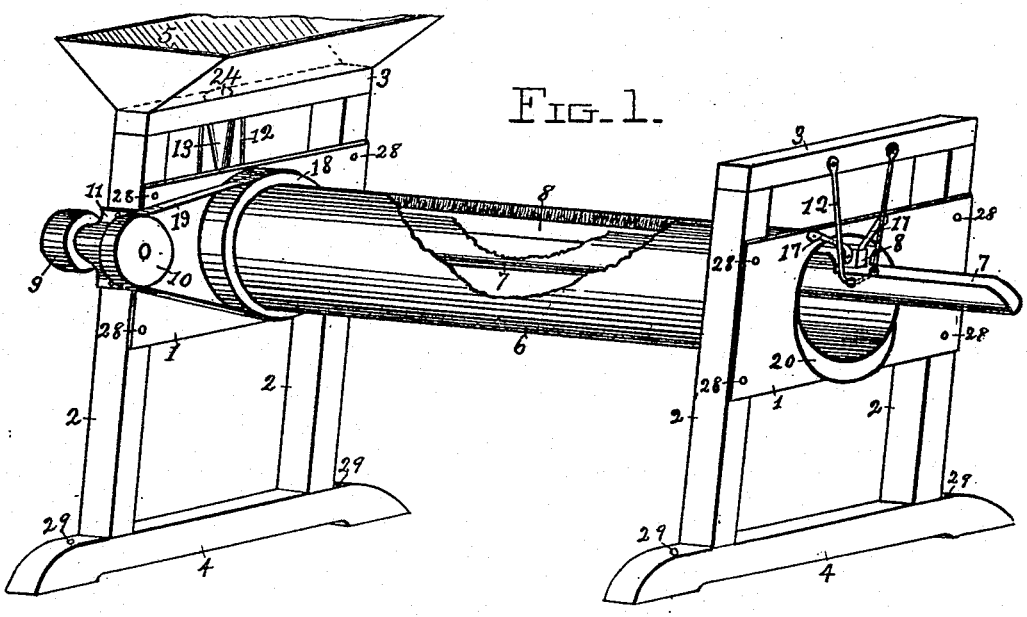
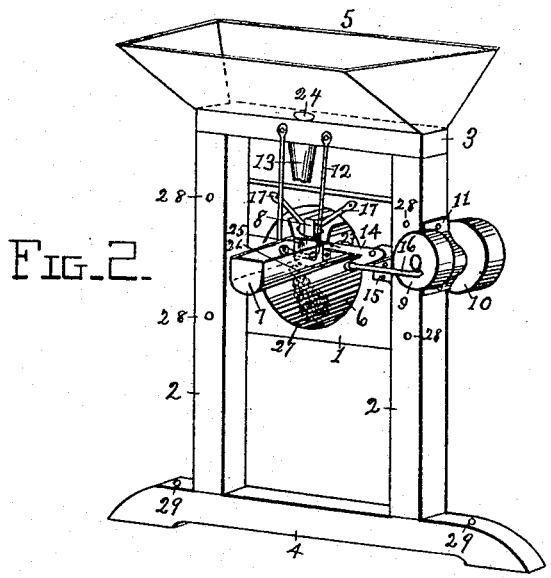
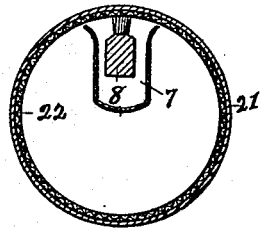
WITNESSES
INVENTOR
Samuel P. Glunt.

UNITED STATES PATENT OFFICE.

SAMUEL P. GLUNT, OF UNION CITY, INDIANA.

SEED-SEPARATOR.

No. 835,517.

Specification of Letters Patent.

Patented Nov. 13, 1906.

Application filed April 13, 1906. Serial No. 311,471.

*To all whom it may concern:*

Be it known that I, SAMUEL P. GLUNT, a citizen of the United States, residing at Union City, in the county of Randolph and State of Indiana, have invented a new and useful Seed-Separator, of which the following is a specification.

My invention relates to improvements in seed-separators; and the object of my invention is to provide a machine adapted more especially to the separation of certain varieties of plantain-seeds, commonly called "buckhorn" or "ribwort," from clover-seed and other smooth seeds, the separation of these seeds from clover-seed having been heretofore made difficult by reason of the approximate uniformity of size and specific gravity of these various seeds. It is well known to seedmen that numbers of these buckhorn or plantain seeds adhere to the inside of grain-bags when emptied of clover-seed that contains an admixture of these impure seeds. It is therefore clear that buckhorn or plantain seeds have a tendency to adhere to a textile. In the production of the present machine I have taken advantage of this tendency with the purpose of effecting a complete separation regardless of the approximate uniformity of size and specific gravity of the respective seeds.

The nature of my invention will be readily comprehended, reference being had to the following detailed description and to the accompanying drawings.

In the drawings, Figure 1 is a perspective view of a seed-separator embodying my invention. Fig. 2 is a perspective view of the front or feed end of the machine. Fig. 3 is a detail sectional view of the machine between the feed and discharge ends.

Referring to the drawings by numerals, 1 is a cast-iron plate forming a part of the frame and a bearing for the cylinder at each end.

2, 3, and 4 constitute the posts, top, and bottom pieces of the frame. The posts 2 at the discharge end are relatively lower than the corresponding posts at the feed end, thereby giving the cylinder an inclination.
The cross-piece 3 at the feed end has an aperture 24, through which the seed passes from the hopper 5, supported on said cross-piece. The seed delivered from the hopper through the opening in the cross-piece at the feed end discharges from a funnel 13 into the pan 7, then through an aperture 26 in the bottom of the pan, and is delivered into the cylinder 6, which is constructed of sheet metal 21 or other material and is lined on the inside with a textile 22. The cylinder is inclined downward from the feed end to the discharge end and is driven by a belt 19, running over belt-pulley 18 and belt-pulley 10, which are driven by belt-pulley 9.

As the inclined cylinder 6 revolves the seed is carried downward toward the discharge end. The clover-seed being smooth continues to roll toward the bottom of the cylinder and toward the discharge end and is delivered over lip 20 into any proper receptacle. The buckhorn or plantain seeds by their tendency to adhere to the textile lining are carried to the top of the cylinder and are swept off by brush 8, which is placed in contact with the textile, falling into pan 7, which is vibrated longitudinally by pitman 16 and quadrant 14, which connects with the pan by ledge 23. The vibration of the pan carries the buckhorn or other separated impurities downward and discharges them at the lower end of the pan into any suitable receptacle. The pan has a partition 25, which separates the seed as it is delivered from the hopper from the buckhorn as it falls into the pan. The pan is hung by inverted bails 12 at each end.

The brush 8 is supported at each end by braces 17, attached to plates 1.

In Fig. 2 funnel 13 is broken off that it may not obscure other parts in the drawings. The funnel in use extends downward into the pan and near to its bottom.

In Fig. 1 the cylinder is cut away to show the pan and brush. The pan is also cut away to more clearly show the brush.

27 shows the seed as it is discharged from the pan into the cylinder.

28 represents bolts, which fasten the plates 1 to the posts.

29 represents lag-screws, which fasten the frames to the floor.

15 is an angle-rest to which quadrant 14 is attached.

11 is a casting forming a bearing for the shaft upon which pulleys 9 and 10 are mounted.

Having thus described my invention, what I claim is—

In a seed-separator, the combination of a pair of frames, a textile-lined cylindrical shell supported at an incline thereby, a brush in contact with and extending longitudinally of the interior of the cylinder, a reciprocating double-compartment pan extending longitudinally of the cylinder and immediately below the brush, and a hopper discharging into one of the compartments of the reciprocating pan and from which the seed is discharged into the cylinder, substantially as described.

In testimony whereof I affix my signature in presence of two witnesses.

SAMUEL P. GLUNT.

Witnesses:
W. J. GLUNT,
W. G. PARENT